Figure 1:
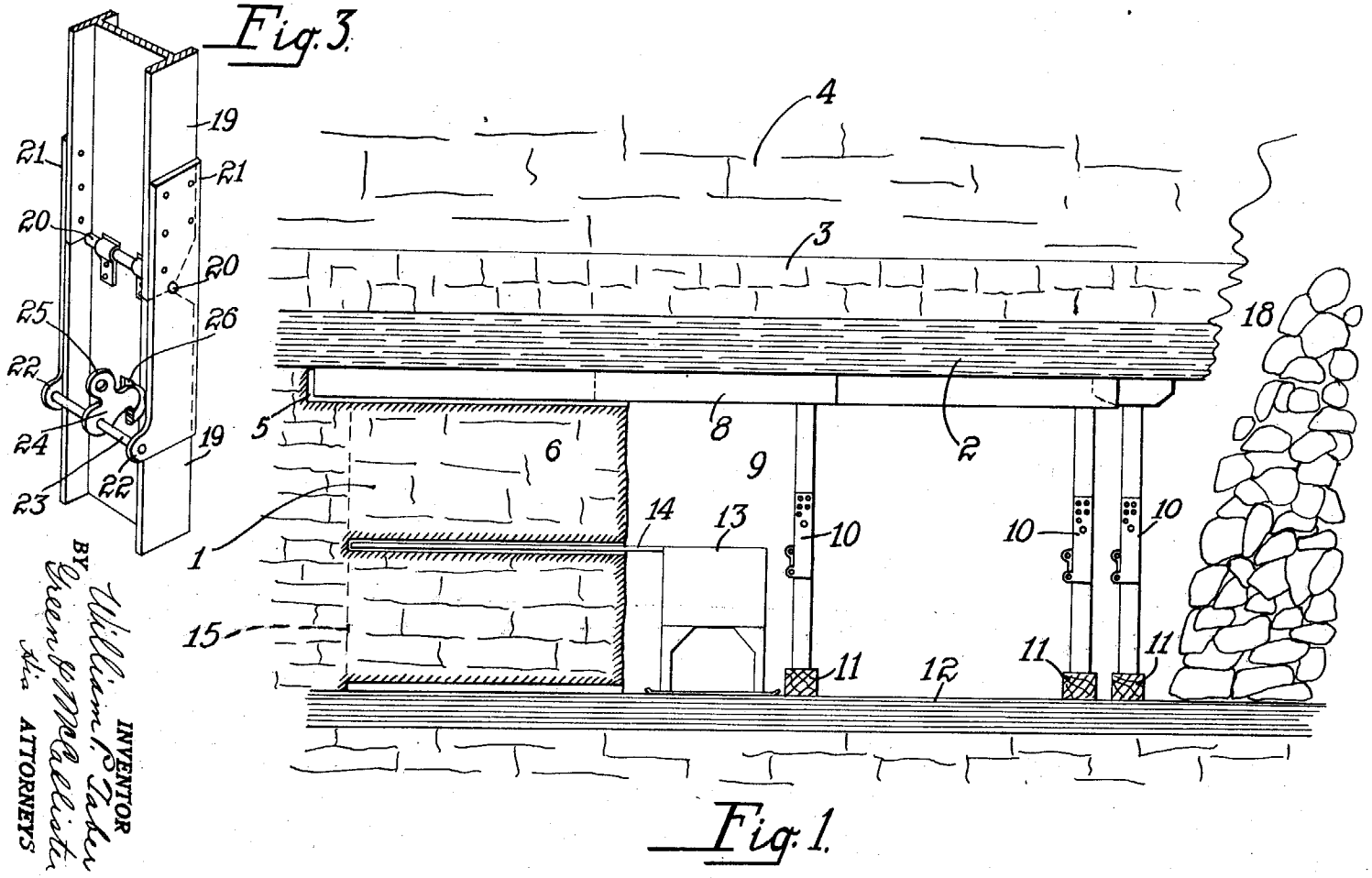

June 14, 1932.

W. P. TABER

Re. 18,491

METHOD OF AND MEANS FOR SUPPORTING ROOF STRATA DURING THE MINING OF MINERALS

Original Filed June 6, 1925 2 Sheets-Sheet 1

INVENTOR
William P. Taber
BY Green & McCallister
His ATTORNEYS

June 14, 1932.

W. P. TABER

Re. 18,491

METHOD OF AND MEANS FOR SUPPORTING ROOF STRATA DURING THE MINING OF MINERALS

Original Filed June 6, 1925 2 Sheets-Sheet 2

INVENTOR
William P. Taber
BY Green & McAllister
his ATTORNEYS

Reissued June 14, 1932 Re. 18,491

UNITED STATES PATENT OFFICE

WILLIAM P. TABER, OF ADENA, OHIO, ASSIGNOR, BY MESNE ASSIGNMENTS, TO PITTSBURGH COAL COMPANY, OF PITTSBURGH, PENNSYLVANIA, A CORPORATION OF PENNSYLVANIA

METHOD OF AND MEANS FOR SUPPORTING ROOF STRATA DURING THE MINING OF MINERALS

Original No. 1,630,589, dated May 31, 1927, Serial No. 35,444, filed June 6, 1925. Application for reissue filed January 11, 1932. Serial No. 585,984.

This invention relates to a method of and means for carrying out mineral mining operations and more particularly to a method of and means for supporting roof strata during the mining of the minerals, and the mining operations themselves.

The enormous weight of the numerous strata between a seam of minerals and the surface of the earth, exerts a pressure so great that it causes a slow subsidence which cannot be prevented by artificial means. This subsidence breaks the tender immediately overlying strata, causing it to fall upon the mineral seam before it is removed unless restrained in some way.

It is, therefore, the principal object of my invention to prevent draw slate and other overlying roof strata from coming down upon a mineral seam such as a vein of coal when it is cut or loosened, to mix with and prevent its removal. Under previous methods of mining, the roof is supported after the minerals have been removed, but it is the purpose of my invention to support the roof strata before the excavation is made so that the roof will be firmly held until the minerals below are cut and removed.

Briefly, my method of supporting roof strata during the mining of minerals contemplates the excavation at the top of a mineral vein, of holes which extend beyond the vertical plane of the section of minerals next to be removed, and then inserting in each hole a support to rest at its inner end upon the solid minerals beyond the section thereof to be taken out, and then sustaining each support at its outer end in the space from which the minerals have been previously removed. Under this method of each time supporting the roof strata before an underlying section of minerals is removed, a long face of coal, for example, can be cleanly and safely mined a good distance in.

It is still another object of my invention to provide for the support of the outer end of each beam whose inner end rests within an excavated hole upon the solid minerals beyond the section thereof to be removed, a reclaimable post which stands upon a block of wood. These posts, while yielding to the subsidence of the roof strata by reason of their penetrating into the wood supports, will exert sufficient resistance to this subsidence to prevent it from breaking the tender overlying strata, and firmly supporting the latter through the beams described until the minerals below have been removed.

Figure 2:
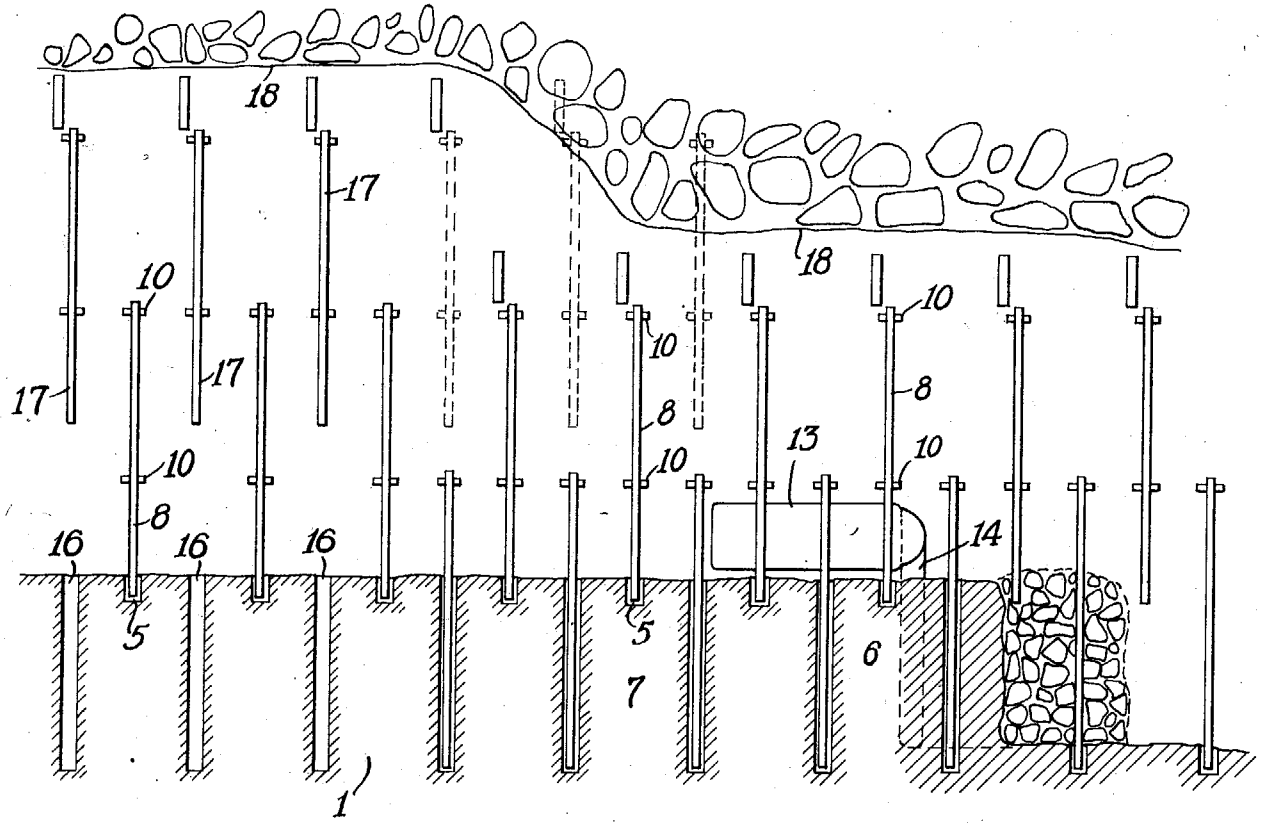

In the accompanying drawings, Figure 1 is a vertical sectional view taken through a coal seam and overlying strata, showing the means which I prefer for carrying out my method of supporting roof strata during the mining of minerals. Figure 2 is a diagrammatic plan view of the same. And Figure 3 is a perspective view of one of the reclaimable posts for sustaining the outer ends of the roof supports.

Referring to the accompanying drawings for a detailed description of my invention, the numeral 1 designates a seam or vein of minerals such as coal above which are such strata as draw slate 2, roof coal 3 and lime stone 4. The enormous weight of these overlying strata exerts so great a pressure that it causes a slow subsidence which cannot be prevented by artificial means. This subsidence will break the tender immediately overlying strata, causing it to fall upon the mineral seam 1 before it is removed, unless restrained in some manner.

Therefore, I have provided for supporting the roof strata before the minerals below are removed, a method which is preferably carried out by the following means. Holes 5 are excavated at or near the top of the mineral vein, which in this instance is the coal seam 1, by boring or otherwise to extend them inwardly beyond the vertical plane of the section 6 of coal to be removed. A support such as a beam 8 is then inserted in each hole 5 a sufficient distance to bring its inner end over the section 7 of solid coal for support thereby. The outer end of the beam, which will extend into the space 9 from which the coal has previously been removed, is preferably supported thereby a reclaimable post 10 to be hereinafter described. Each post 10 stands upon a wood block 11 resting upon the floor 12 to yieldingly support the outer end of its respective beam 8. These blocks 11 permit the posts 10 to yield slightly to the subsidence of the overlying strata, but at the same time exert sufficient resistance to it to prevent it from coming down upon the coal before it is taken out.

Along the outer face of the coal 6 between the latter and the wood blocks 11, a mining machine 13 is free to travel to draw its cutter 14 through the coal to loosen it as shown in Figure 1. The cutter 14 does not extend as far into the coal as the holes 5 do, but only to the vertical plane on the dotted line 15 in Figure 1, so that during the loosening and removal of the coal section 6 the beams 8 will be firmly supported at their inner ends by the solid section 7 of the coal beyond that plane and at their outer ends by the reclaimable posts. Thus the tender immediately overlying strata which might otherwise be forced down by the subsidence of the heavy strata above to mix with the coal 6 being removed, is yieldingly sustained by these beams until that coal is removed and other beams are inserted in new holes excavated to points beyond the solid section of coal 7 to permit its safe removal.

Before the section of coal 7 now to be reremoved is loosened, holes 16 similar to the holes 5 are excavated to extend beyond it at or near its top and between the vertical planes of said holes 5. Into these holes 16 beams 17 are moved, and the posts 10 which supported the outer ends of the latter beyond the cave line 18, as indicated by dotted lines in Figure 2, are reclaimed and set under the outer ends of these beams in their new positions. These beams 17, assisted by the beams 8 under the middle portion of each one of which an additional post 10 is placed, will support the immediately overlying roof strata until the section of coal 7 is loosened and removed. This method of each time supporting the roof strata before the minerals beneath have been loosened and taken out, may be continued inwardly for a good distance so that a long face of them may be cleanly and safely mined.

The reclaimable posts which I prefer for supporting the outer ends of the beams 8 and 17, are collapsible ones of the type shown in Figure 3. Each one of these reclaimable posts comprises two I beam sections 19, 19 which are pivotally connected together end to end by hinge pin 20 and toward which the edges of the flanges on one side of the post incline so these sections may be collapsed. (See Figure 3).

Secured to each flange of the upper I beam section 19 is a bracing plate 21 through a hole in which one end of the hinge pin 20 projects. Each plate 21 terminates at its lower end in an apertured ear 22 which projects beyond its respective flange on the lower I beam section 19. Secured between the ear portions 22, 22 of the plates 21, 21 respectively, is a rod 23 on whose middle portion there is secured a latch 24 having an upwardly projecting apertured ear 25. Opposite the nose of this latch a hole 26 is formed in the lower I beam section's web to permit the latch to engage the edge of it to hold both I beam sections in vertical alinement to form a solid supporting post 10 for the purpose described. When it is desired to reclaim the post, a hook on a block and tackle or other device is engaged in the apertured ear 25 of the latch 24 to disengage it from the web of the lower I beam section, whereupon a strong pull upon the latch will collapse the two I beam sections of the post as it is drawn from the descending roof of the mine.

What I claim as new and desire to secure by Letters Patent is.

1. The herein described method of supporting roof strata during the mining of minerals, which consists in excavating at the top of a mineral vein, a hole which extends beyond the vertical plane of the section of minerals next to be removed, then inserting in said hole a support to rest at its inner end upon the solid minerals beyond the section thereof to be taken out, and then sustaining said support at its outer end in the space from which the minerals have previously been removed.

2. Means for supporting roof strata during the mining of a mineral vein, the latter being excavated to form a hole which extends beyond the vertical plane of the section of minerals next to be removed, a support insertible in said hole to rest at its inner end upon the solid minerals beyond the section thereof to be taken out, and means for sustaining the outer end of said support in the space from which the minerals have previously been removed.

3. Means for supporting roof strata during the mining of a mineral vein, the latter being excavated to form a hole which extends beyond the vertical plane of the section of minerals next to be removed, a support insertible in said hole to rest at its inner end upon the solid minerals beyond the section thereof to be taken out, a post for sustaining the outer end of said support, and a wood block for supporting the post in the space from which the minerals have previously been removed.

4. Means for supporting roof strata during the mining of a mineral vein, the latter being excavated to form a hole which extends beyond the vertical plane of the section of minerals next to be removed, a support insertible in said hole to rest at its inner end upon the solid minerals beyond the section thereof to be taken out, a wood block in the space from which the minerals have previously been removed, and a post of narrow cross section at its bottom resting upon, and penetrating into, said wood block to yieldingly sustain the outer end of said support.

5. The herein described method of supporting roof strata during the mining of minerals, which consists in excavating at the top of a mineral vein, a hole which extends beyond the vertical plane of the section of minerals next to be removed, then inserting in said hole a support to rest at its inner end upon the solid minerals beyond the section thereof to be taken out, and then sustaining said support at its outer end in the space from which the minerals have previously been removed and mining said section of minerals.

6. Means for supporting roof strata prior to and during the mining of a mineral vein, the latter being excavated to form a hole which extends beyond the vertical plane of the section of minerals next to be removed, a support for said roof strata insertible in said hole and in contact with said roof strata to rest at its inner end upon the solid minerals beyond the section thereof to be taken out and being longer than said hole so that an end of said support projects therefrom, and means for sustaining the projecting end of said support in the space from which the minerals have previously been removed.

7. Means for supporting roof strata during the mining of a mineral vein, the latter being excavated to form a hole which extends beyond the vertical plane of the section of minerals next to be removed, a support insertible in said hole to rest at its inner end upon the solid minerals beyond the section thereof to be taken out, and means for sustaining the outer end of said support in the space from which the minerals have previously been removed, said means being disposed substantially at right angles to said support.

8. Means for supporting roof strata prior to and during the mining of a mineral vein, the latter being excavated to form a hole which extends beyond the vertical plane of the section of minerals next to be removed, a support for said roof strata insertible in said hole and in contact with said roof strata to rest at its inner end upon the solid minerals beyond the section thereof to be taken out and being longer than said hole so that an end of said support projects therefrom, and means for sustaining the projecting end of said support in the space from which the minerals have previously been removed, said means being disposed substantially at right angles to said support.

9. The hereindescribed method of supporting roof strata prior to and during the mining of minerals, which comprises excavating at or near the top of the mineral vein a series of spaced holes which extend beyond the vertical plane of the section of minerals next to be removed, then inserting in said holes supports longer than said holes and resting at their inner ends on the solid minerals beyond the section thereof to be taken out, and sustaining said supports at their outer ends in the space from which the minerals have previously been removed.

10. The hereindescribed method of supporting roof strata prior to and during the mining of minerals, which comprises excavating at or near the top of the mineral vein a series of spaced holes which extend beyond the vertical plane of the section of minerals next to be removed, then inserting in said holes supports longer than said holes and resting at their inner ends on the solid minerals beyond the section thereof to be taken out, and sustaining said supports at their outer ends in the space from which the minerals have previously been removed and finally mining said section of minerals.

11. The herindescribed method of supporting roof strata prior to and during the mining of minerals, which comprises excavating at or near the top of the mineral vein a series of spaced holes which extend beyond the vertical plane of the section of minerals next to be removed, then inserting in said holes supports longer than said holes and resting at their inner ends on the solid minerals beyond the section thereof to be taken out, and sustaining said supports at their outer ends in the space from which the minerals have previously been removed and finally mining said section of minerals, then excavating similar holes in the subsequent section of minerals to be mined and moving up and inserting therein in sandwiched relation to said supports aforementioned a set of supports for the latter holes, supports for previous mineral sections being removed as the minerals on which they rest are removed.

In testimony whereof, I have hereunto subscribed my name this 8th day of January, 1932.

WILLIAM P. TABER.